United States Patent
Pinto et al.

(10) Patent No.: US 12,240,441 B2
(45) Date of Patent: Mar. 4, 2025

(54) CONTROL DEVICE AND CONTROL METHOD FOR VEHICLE

(71) Applicant: HYUNDAI MOBIS Co., Ltd., Seoul (KR)

(72) Inventors: Lorenzo Pinto, Frankfurt a.M. (DE); Flavio Montalbano, Bad Vilbel (DE)

(73) Assignee: HYUNDAI MOBIS CO., LTD., Seoul (KR)

(*) Notice: Subject to any disclaimer, the term of this patent is extended or adjusted under 35 U.S.C. 154(b) by 273 days.

(21) Appl. No.: 17/888,886

(22) Filed: Aug. 16, 2022

(65) Prior Publication Data

US 2023/0311852 A1 Oct. 5, 2023

(51) Int. Cl.
*B60W 10/14* (2012.01)
*B60W 10/119* (2012.01)
*B60W 10/12* (2012.01)
*B60W 30/045* (2012.01)
*B60W 40/101* (2012.01)

(52) U.S. Cl.
CPC .......... *B60W 30/045* (2013.01); *B60W 10/12* (2013.01); *B60W 10/14* (2013.01); *B60W 40/101* (2013.01); *B60W 2520/06* (2013.01); *B60W 2520/10* (2013.01); *B60W 2520/14* (2013.01); *B60W 2720/20* (2013.01)

(58) Field of Classification Search
CPC .... B60W 10/14; B60W 10/119; B60W 30/02; B60W 30/045; B60W 40/101; B60W 40/105; B60W 40/107; B60W 40/109; B60W 40/114; B60W 2520/06; B60W 2520/10; B60W 2520/14; B60W 2720/20
USPC .................. 701/41, 69, 82, 87, 89
See application file for complete search history.

(56) References Cited

U.S. PATENT DOCUMENTS

| | | | |
|---|---|---|---|
| 8,024,091 B2 * | 9/2011 | Takenaka | B60W 50/06 701/72 |
| 2009/0228181 A1 | 9/2009 | Luders et al. | |
| 2009/0319114 A1 * | 12/2009 | Takenaka | B60W 10/04 701/48 |
| 2010/0114449 A1 | 5/2010 | Shiozawa et al. | |
| 2020/0207332 A1 * | 7/2020 | Chatzikomis | B60L 7/00 |

(Continued)

FOREIGN PATENT DOCUMENTS

JP 2009-61888 A 3/2009

OTHER PUBLICATIONS

German Office Action dated Dec. 21, 2022, issued in corresponding German Patent Application No. 102022107413.7 with English Translation.

*Primary Examiner* — Erick R Solis
(74) *Attorney, Agent, or Firm* — Morgan, Lewis & Bockius LLP

(57) ABSTRACT

A control device for a vehicle comprising: a sensor that acquires information on a driving direction and a speed of the vehicle; a first calculator that calculates a slip angle of front wheels and a slip angle of rear wheels of the vehicle based on the information acquired by the sensor; a second calculator that calculates a saturation index of the front wheels and a saturation index of the rear wheels using a phase plane related to the slip angle of the front wheels and the slip angle of the rear wheels; and a controller that distributes traction torque to a front wheel axle and a rear wheel axle based on the phase plane and the saturation index of the front wheels and the saturation index of the rear wheels.

7 Claims, 6 Drawing Sheets

(56) References Cited

U.S. PATENT DOCUMENTS

2021/0269018 A1* 9/2021 Liu ................... B60W 30/045
2023/0339456 A1* 10/2023 Luo ................... B60W 40/114

* cited by examiner

CONTROL DEVICE AND CONTROL METHOD FOR VEHICLE

CROSS-REFERENCE TO RELATED APPLICATION

The present application claims priority to German Patent Application No. 102022107413.7, filed on Mar. 29, 2022, the entire contents of which is incorporated herein for all purposes by this reference.

TECHNICAL FIELD

The present disclosure relates to a control device and a control method for a vehicle.

BACKGROUND

The content described in this section merely provides background information for the present disclosure and does not constitute the prior art.

An AWD (All Wheel Drive) vehicle refers to a vehicle driven by providing driving force to four wheels. The AWD vehicle may be classified into a fixed distribution type and a variable distribution type according to a distribution method of traction torque. The fixed distribution refers to a method of distributing traction torque to the front wheel axle and the rear wheel axle of the vehicle at a constant ratio. The variable distribution refers to a method of distributing traction torque to the front wheel axle and the rear wheel axle of the vehicle at a ratio in which the ratio is adjusted depending on driving conditions, using for instance an electronically controlled clutch, or by controlling independently front and rear electric motors in dual motors electric powertrains.

Conventionally, a method of distributing traction torque to the axle after detecting understeer and oversteer of a vehicle using an ESC (Electronic Stability Control) and the like mounted on the vehicle and a method of distributing traction torque after estimating a force acting on each wheel are used.

The method of distributing traction torque after detecting understeer and oversteer of a vehicle using an ESC mounted on the vehicle has a problem in that traction torque is distributed after the understeer and the oversteer have already occurred.

The method of distributing traction torque after estimating a force acting on each wheel has a problem in that it is difficult to distribute the traction torque smoothly on a curved path, which reduces the driving stability of the vehicle.

SUMMARY

According to at least one aspect, the present disclosure provides a control device for a vehicle, which is configured to distribute traction torque to a front wheel axle and a rear wheel axle of the vehicle, the control device comprising: a sensor that acquires information on a driving direction and a speed of the vehicle; a first calculator that calculates a slip angle of front wheels and a slip angle of rear wheels of the vehicle based on the information acquired by the sensor; a second calculator that calculates a saturation index of the front wheels and a saturation index of the rear wheels using a phase plane related to the slip angle; and a controller that distributes traction torque to a front wheel axle and a rear wheel axle based on the phase plane and the saturation index.

According to another aspect, the present disclosure provides a control method for a vehicle, comprising: acquiring information on a driving direction and a speed of the vehicle; calculating a slip angle of front wheels and a slip angle of rear wheels of the vehicle based on the information; calculating a saturation index of the front wheels and a saturation index of the rear wheels using a phase plane related to the slip angle; and distributing traction torque to a front wheel axle and a rear wheel axle of the vehicle based on the phase plane and the saturation index.

DETAILED DESCRIPTION

Figure 1:
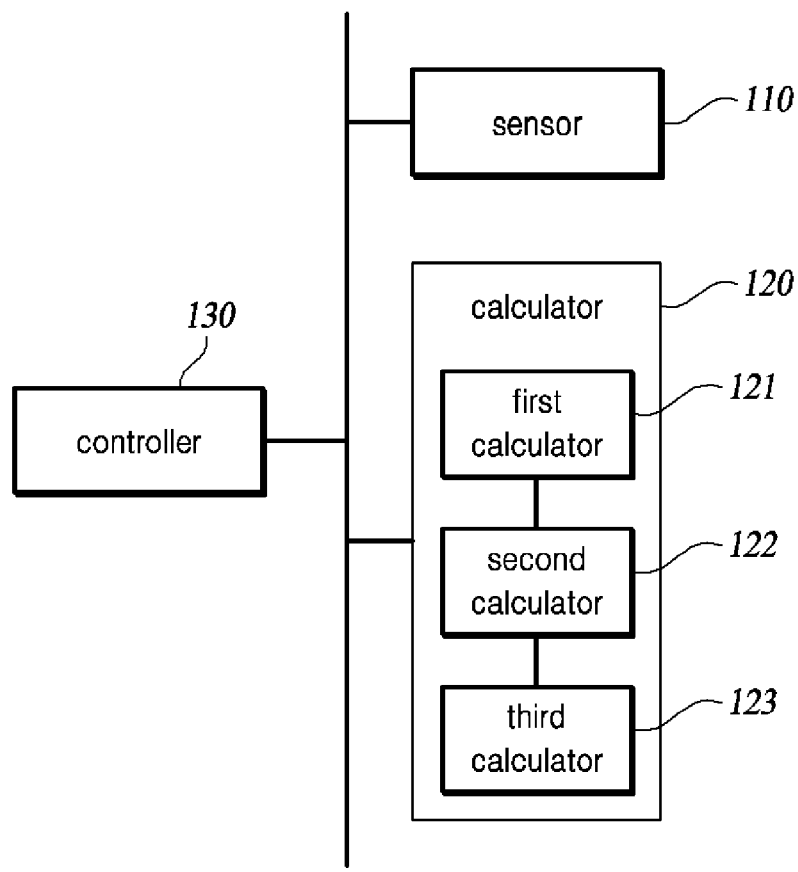
FIG. 1 is a block diagram of a control device for a vehicle according to one embodiment of the present disclosure.

In view of the above, the present disclosure provides a control device for a vehicle capable of preventing understeer and oversteer of the vehicle by distributing traction torque to axles, using a phase plane and a saturation index related to a slip angle of wheels.

Further, the present disclosure provides a control device for a vehicle capable of improving driving stability of the vehicle on a curved path by distributing traction torque to the axles, using a phase plane and a saturation index related to a slip angle of wheels.

The objective to be achieved by the present disclosure is not limited to the above-mentioned objectives, and other objectives not mentioned will be clearly understood by those skilled in the art from the following description.

Hereinafter, some exemplary embodiments of the present disclosure will be described in detail with reference to the accompanying drawings. In the following description, same reference numerals preferably designate same elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughtout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a block diagram of a control device for a vehicle according to one embodiment of the present disclosure.

Referring to FIG. 1, a control device 100 for a vehicle according to one embodiment of the present disclosure may include a sensor 110, a calculator 120, and a controller 130.

The calculator 120 may include a first calculator 121, a second calculator 122, and a third calculator 123.

Here, a slip angle refers to an angle between a direction in which the wheels of the vehicle face and a running direction of the vehicle. Based on information obtained by the sensor 110, the calculator 120 may calculate saturation index of front and rear wheels of the vehicle. The sensor 110 acquires information about the driving direction and the speed of the vehicle. The sensor 110 may transmit the acquired information to the calculator 120 and the controller 130. Based on the information acquired by the sensor 110, the calculator 120 may calculate slip angles of the front wheels and the rear wheels of the vehicle. Here, the saturation index may indicate a degree away from a point at which understeer or oversteer of the vehicle occurs on a phase plane 200 related to the slip angle. Based on the information acquired by the sensor 110, the calculator 120 may calculate residual torques of a front wheel axle and a rear wheel axle. Based on the information obtained by the sensor 110, the controller 130 may control the vehicle.

The sensor 110 may detect one or more of a yaw rate of the vehicle, a vehicle speed in a longitudinal direction of the front wheels, a vehicle speed in a longitudinal direction of the rear wheels, a vehicle acceleration in the longitudinal direction of the front wheels, a vehicle acceleration in the longitudinal direction of the rear wheels, a vehicle speed in a lateral direction of the front wheels, a vehicle speed in a lateral direction of the rear wheels, a vehicle acceleration in the lateral direction of the front wheels, a vehicle acceleration in the lateral direction of the rear wheels, a traction torque acting on the front axle, a traction torque acting on the rear axle, a steering wheel rotation angle, and a steering angle. Here, the longitudinal direction refers to a direction in which the wheels of the vehicle face, and the lateral direction refers to a direction perpendicular to the longitudinal direction.

The calculator 120 may calculate the slip angle of the front wheel and the slip angle of the rear wheel based on the information acquired by the sensor 110. The calculator 120 may calculate the saturation index of the front wheel and the saturation index of the rear wheel by using the phase plane 200 related to the slip angles of the front wheels and the rear wheels. The calculator 120 may calculate the residual torque of the front axle and the rear axle. The calculator 120 may transmit calculation information to the controller 130. Based on the information received from the calculator 120, the controller 130 may distribute the traction torque to the front axle and the rear axle.

The first calculator 121 may receive information acquired by the sensor 110 from the sensor 110. The first calculator 121 may calculate the slip angles of the front wheels and the rear wheels, respectively, based on the information received from the sensor 110. The first calculator 121 may transmit information about the slip angles of the front wheels and the rear wheels to the second calculator 122 and/or the controller 130. Based on the information received from the first calculator 121, the second calculator 122 may calculate the saturation indexes of the front wheels and the rear wheels. The controller 130 may control the vehicle based on the information received from the first calculator 121.

The second calculator 122 may receive information about the slip angles of the front wheels and the rear wheels from the first calculator 121. The second calculator 122 may receive information about the driving direction and the speed of the vehicle from the sensor 110. The second calculator 122 may calculate the saturation indexes of the front wheels and the rear wheels, respectively, based on the information about the slip angle, the information about the driving direction of the vehicle, and the information about the speed of the vehicle. Here, the saturation index may indicate a degree away from a point at which understeer or oversteer of the vehicle occurs on the phase plane 200 related to the slip angle. The second calculator 122 may transmit information about the saturation indexes of the front wheel and the rear wheel to the controller 130. Based on the information received from the second calculator 122, the controller 130 may distribute the traction torque to the front axle and the rear axle.

The third calculator 123 may calculate the residual torque of the front axle and the rear axle. The third calculator 123 may receive information about the traction torque acting on the front wheel axle and the rear wheel axle from the sensor 110. The third calculator 123 may calculate the residual torque based on the traction torque acting on the axle and the available traction torque. Here, the available traction torque may be a preset value for each of the front wheel axle and the rear wheel axle. The third calculator 123 may transmit information on the residual torque to the controller 130. The controller 130 may distribute the traction torque to the front axle and the rear axle based on the information received from the third calculator 123. The controller 130 may reduce the total traction torque of the vehicle based on the information received from the third calculator 123. By distributing or reducing the traction torque based on the residual torque, the controller 130 may efficiently control the vehicle.

The controller 130 may receive information from the sensor 110 and the calculator 120. The controller 130 may control the vehicle based on the received information. The controller 130 may distribute the traction torque to the front axle and the rear axle or may reduce the total traction torque of the vehicle based on the received information. The controller 130 may distribute the traction torque to the front axle and the rear axle based on the phase plane 200 and the saturation index related to the slip angle of the wheel. The controller 130 may distribute the traction torque by comparing the saturation index of the front wheel and the saturation index of the rear wheel.

The controller 130 may reduce the total traction torque of the vehicle to a preset torque value based on whether both the saturation index of the front wheel and the saturation index of the rear wheel exceed a preset threshold value. Here, the preset threshold value may be a value lower than a saturation index at which understeer or oversteer of the vehicle occurs. In case that it is difficult to secure the driving stability of the vehicle only by distributing the traction torque when both the saturation index of the front wheels and the saturation index of the rear wheels exceed the preset threshold value, the controller 130 reduces the total traction torque of the vehicle, so that the vehicle can be driven stably.

The controller 130 may distribute and/or reduce the traction torque based on the residual torque. The controller 130 may distribute the traction torque to the front axle and the rear axle based on the saturation index and an optimum torque value. Here, the optimum torque value may be a preset value for each of the front wheel axle and the rear wheel axle. The controller 130 may determine residual stability of the vehicle using the phase plane 200 and the saturation index. Here, the residual stability means the difference between the slip angle and the amount of change in the slip angle at which understeer or oversteer of the vehicle occurs and the current slip angle and the amount of change in the slip angle of the vehicle. The controller 130 may distribute the traction torque to the front axle and the rear axle based on the residual stability.

Figure 2:
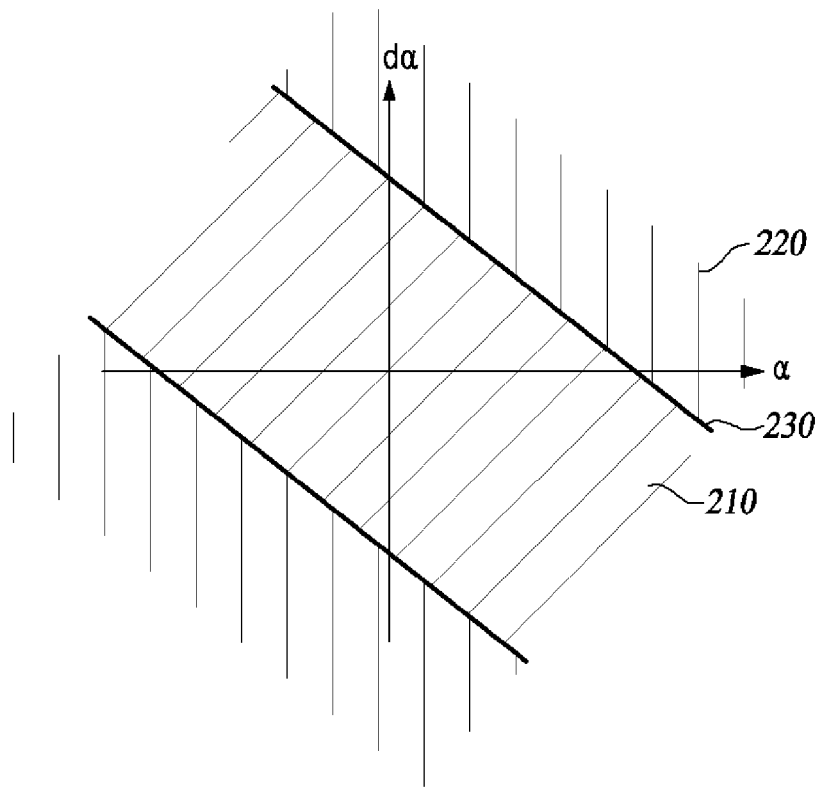
FIG. 2 is a diagram illustrating a phase plane used by the control device according to one embodiment of the present disclosure.

FIG. 2 is a diagram illustrating a phase plane used by the control device according to one embodiment of the present disclosure.

Referring to FIG. 2, the phase plane 200 used by the control device 100 according to an embodiment of the present disclosure may include a stable region 210, an unstable region 220, and a boundary region 230.

On the phase plane 200, the x-axis indicates the slip angles of the wheels, and the y-axis indicates the amount of change in the slip angle with time. The control device 100 may use the phase plane 200 of each of the front and the rear wheels. The stable region 210, the unstable region 220, and the boundary region 230 on the phase plane 200 for the front wheels may be determined based on the slip angle of the front wheels and the amount of change in the slip angle at which understeer of the vehicle occurs. The stable region 210, the unstable region 220, and the boundary region 230 on the phase plane 200 for the rear wheels may be determined based on the slip angle of the rear wheels and the amount of change in the slip angle at which oversteer of the vehicle occurs.

The boundary region 230 separates the stable region 210 and the unstable region 220 on the phase plane 200. The boundary region 230 on the phase plane 200 related to the front wheels may indicate the slip angle of the front wheels and the amount of change in the slip angle at which understeer of the vehicle occurs. The boundary region 230 on the phase plane 200 for the rear wheels may indicate the slip angle of the rear wheels and the amount of change in the slip angle at which oversteer of the vehicle occurs. The saturation index of the wheel on the phase plane 200 indicates a distance away from the boundary area 230. The boundary region 230 of the phase plane 200 may be determined using an experiment or a preset formula.

Although the boundary region 230 of the phase plane 200 is shown in a straight line in FIG. 2, the shape of the boundary region 230 is not necessarily limited to the straight line. The boundary area 230 may have various shapes, such as an ellipse, a parabola, and a rectangle, depending on the purpose and situation. Instability related to vehicle slip, such as understeer and oversteer, mainly occurs when the slip angle increases. Even if the shape of the boundary region 230 is changed, instabilities such as understeer and oversteer of the vehicle may appear in the first and third quadrants on the phase plane 200.

The control device 100 may determine residual stability of the vehicle using the phase plane 200 and the saturation index. Here, the residual stability indicates the difference between the slip angle and the amount of change in the slip angle in which instability such as understeer and oversteer of the vehicle occur, and the current slip angle and the current amount of change in the slip angle of the vehicle. The control device 100 may efficiently distribute the traction torque to the front axle and the rear axle based on the residual stability.

Figure 3A:
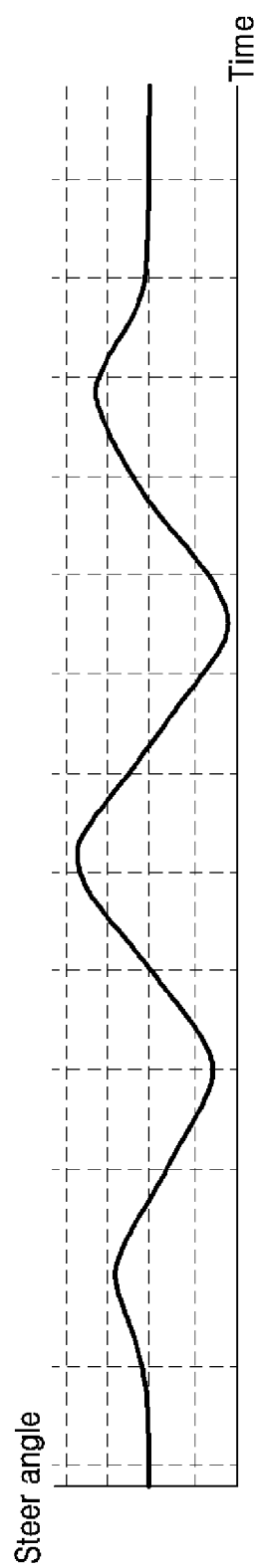
FIGS. 3A to 3C are graphs respectively illustrating a steering angle, a saturation index, and a torque distribution of a vehicle over time according to one embodiment of the present disclosure.
Figure 3B:
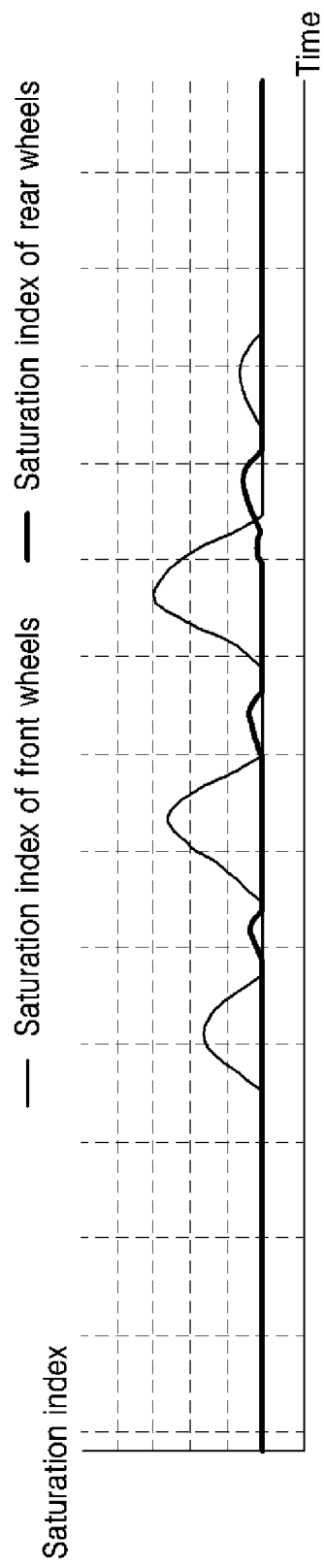
Figure 3C:
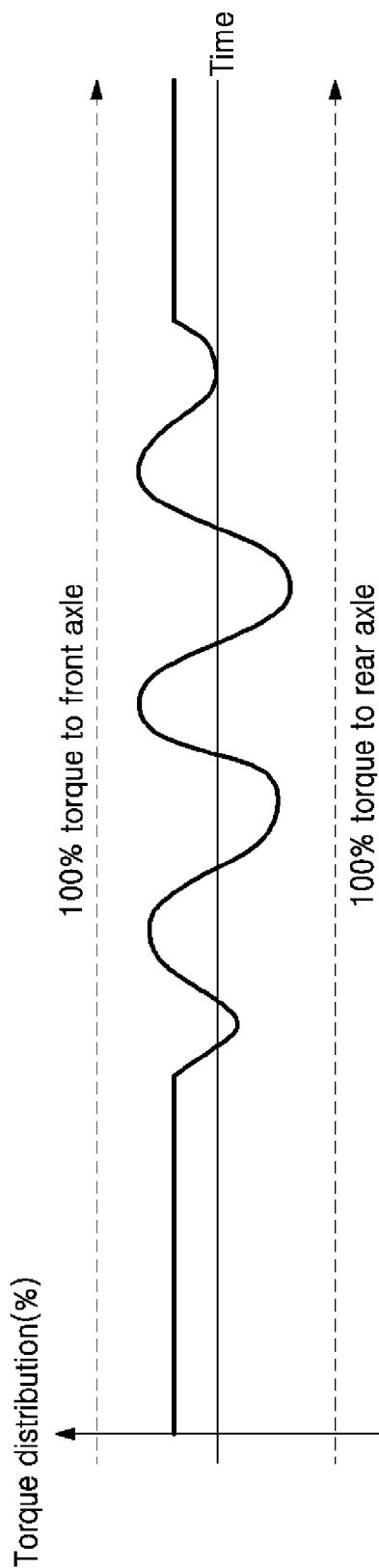

FIGS. 3A to 3B are graphs respectively illustrating a steering angle, a saturation index, and a torque distribution of a vehicle over time according to one embodiment of the present disclosure.

Referring to FIGS. 3A to 3B, the control device 100 for a vehicle according to one embodiment of the present disclosure may distribute traction torque to the axles based on a steering angle and a saturation index of the vehicle. The sensor 110 may continuously acquire information about the driving direction and speed of the vehicle with time. The calculator 120 may continuously calculate the saturation indexes of the front wheels and the rear wheels. The controller 130 may distribute the traction torque to the front axle and the rear axle continuously based on the saturation indexes.

When the saturation index of the front wheels increases, the control device 100 for a vehicle controls the vehicle so that the traction torque is transmitted from the front axle to the rear axle based on the saturation index of the front wheels. When the saturation index of the rear wheels increases, the control device 100 for the vehicle controls the vehicle so that the traction torque is transmitted from the rear axle to the front axle based on the saturation index of the rear wheels. Since the control device 100 for the vehicle continuously distributes the traction torque with time, it is possible to continuously prevent understeer and oversteer of the vehicle.

Figure 4:
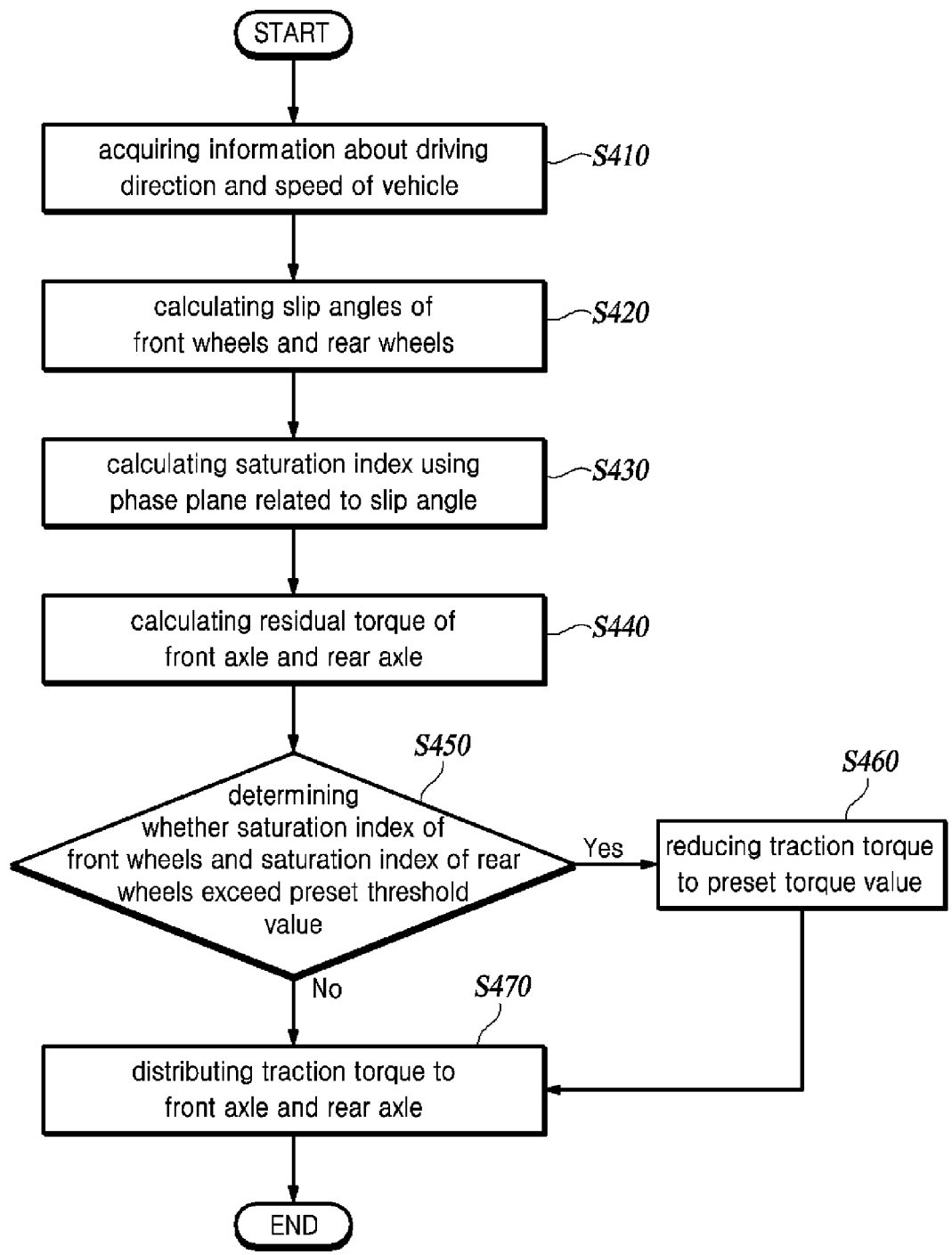
FIG. 4 is a flowchart of a control method for a vehicle according to one embodiment of the present disclosure.

FIG. 4 is a flowchart of a control method for a vehicle according to one embodiment of the present disclosure.

The method of controlling a vehicle according to one embodiment of the present disclosure will be described with reference to FIG. 4.

The sensor 110 acquires information about the driving direction and speed of the vehicle (S410). The sensor 110 may detect one or more of a yaw rate of the vehicle, a vehicle speed in the longitudinal direction of the front wheels, a vehicle speed in the longitudinal direction of the rear wheels, a vehicle acceleration in the longitudinal direction of the front wheels, a vehicle acceleration in the longitudinal direction of the rear wheels, a vehicle speed in the lateral direction of the front wheels, a vehicle speed in the lateral direction of the rear wheels, a vehicle acceleration in the lateral direction of the front wheels, a vehicle acceleration in the lateral direction of the rear wheels, a traction torque acting on the front axle, a traction torque acting on the rear axle, a steering wheel rotation angle, and a steering angle.

The calculator 120 calculates the slip angles of the front wheels and the rear wheels (S420). The calculator 120 may calculate the slip angles of the front wheels and the rear wheels, respectively, based on the information acquired by the sensor 110. Here, the slip angle indicates an angle between the driving direction of the vehicle and the direction in which the wheels are directed.

The calculator 120 calculates a saturation index using the phase plane related to the slip angle (S430). The calculator 120 may calculate the saturation index of each of the front wheels and the rear wheels using the phase plane 200 related to the slip angle. Here, the saturation index may indicate a distance away from the boundary region 230 on the phase plane 200. The boundary area 230 may be determined based on a slip angle at which understeer or oversteer of the vehicle occurs.

The calculator 120 calculates the residual torque of the front axle and the rear axle (S440). The calculator 120 may calculate the residual torque of the front axle and the rear axle based on the information acquired by the sensor 110. The calculator 120 may calculate the residual torque based on the traction torque acting on the axle and an available traction torque. Here, the available traction torque may be a preset value for each of the front axle and the rear axle.

The controller 130 determines whether the saturation index of the front wheels and the saturation index of the rear wheels exceed a preset threshold value (S450). The controller 130 may determine whether both the saturation index of the front wheels and the saturation index of the rear wheels exceed the preset threshold value. Here, the preset threshold value may be a value lower than the saturation index at which understeer or oversteer of the vehicle occurs.

When the saturation index of the front wheels and the saturation index of the rear wheels exceed the preset threshold value, the controller 130 reduces the traction torque to a preset torque value (S460). When both the saturation index of the front wheels and the saturation index of the rear wheels exceed the preset threshold value, the controller 130 may reduce the total traction torque of the vehicle to the preset torque value. When it is difficult to secure the driving stability of the vehicle only by distributing the traction torque since both the saturation index of the front wheels and the saturation index of the rear wheels exceed the preset threshold value, the controller 130 reduces the total traction torque so that the vehicle can be driven stably.

The controller 130 distributes the traction torque to the front axle and the rear axle (S470). The controller 130 may distribute the traction torque to the front axle and the rear axle based on the phase plane 200, the saturation index, and the residual torque. When the saturation index of the front wheels increases, the controller 130 may control the vehicle to transmit the traction torque from the front axle to the rear axle. When the saturation index of the rear wheels increases, the controller 130 may control the vehicle to transmit the traction torque from the rear axle to the front axle.

According to one embodiment, the control device of the vehicle can prevent understeer and oversteer of the vehicle by distributing traction torque to the axles, using the phase plane and the saturation index related to the slip angles of the wheels.

Further, according to one embodiment, the control device of the vehicle can improve driving stability of the vehicle on a curved path by distributing the traction torque to the axles, using the phase plane and the saturation index related to the slip angles of the wheels.

Although it is described that the processes are sequentially executed in the flowchart of the present disclosure, this is merely illustrative of the technical idea of some embodiments of the present disclosure. In other words, since an ordinary skilled person in the art to which the embodiments of the present disclosure pertain may make various modifications and changes by changing the processes described in the flowchart/timing diagram or performing one or more of the processes in parallel without departing from the essential characteristics of the embodiments of the present disclosure, the flowchart/timing diagram is not limited to a time-series order.

Various implementations of the systems and techniques described herein may be realized by digital electronic circuits, integrated circuits, field programmable gate arrays (FPGAs), application specific integrated circuits (ASICs), computer hardware, firmware, software, and/or combination thereof. These various implementations may include an implementation by one or more computer programs executable on a programmable system. The programmable system includes at least one programmable processor (which may be a special purpose processor or a general-purpose processor) coupled to a storage system, at least one input device, and at least one output device to receive and transmit data and instructions therefrom and thereto. Computer programs (also known as programs, software, software applications or codes) contain instructions for the programmable processor and are stored in a "computer-readable medium".

The computer-readable recording medium includes all types of recording devices in which data readable by a computer system is stored. The computer-readable recording medium may include non-volatile or non-transitory mediums such as ROM, RAM, CD-ROM, magnetic tape, floppy disk, memory card, hard disk, optical disk, and storage device, and may further include a temporary medium such as a data transmission medium. In addition, the computer-readable recording medium may be distributed in a network-connected computer system, and computer-readable codes may be stored and executed in a distributed manner.

Various implementations of systems and techniques described herein may be implemented by a programmable computer. Here, the computer includes a programmable processor, a data storage system (including a volatile memory, a nonvolatile memory, or another type of storage system or a combination thereof), and at least one communication interface. For example, a programmable computer may be one of a server, a network device, a set-top box, a built-in device, a computer expansion module, a personal computer, a laptop, a personal data assistant (PDA), a cloud computing system, and a mobile device.

Although exemplary embodiments of the present disclosure have been described for illustrate purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A control device for a vehicle comprising:
   a sensor that acquires information on a driving direction and a speed of the vehicle;
   a first calculator that calculates a slip angle of front wheels and a slip angle of rear wheels of the vehicle based on the information acquired by the sensor;
   a second calculator that calculates a saturation index of the front wheels and a saturation index of the rear wheels using a phase plane related to the slip angle of the front wheels and the slip angle of the rear wheels;
   a third calculator that calculates residual torque of a front wheel axle and a rear wheel axle; and
   a controller that distributes traction torque to the front wheel axle and the rear wheel axle based on the phase plane, the saturation index, and the residual torque of the front wheels and the rear wheels,
   wherein the controller determines whether the saturation index of the front wheels and the saturation index of the rear wheels exceed a preset threshold value which is a value lower than the saturation index at which understeer or oversteer of the vehicle occurs,
   when the saturation index of the front wheels and the saturation index of the rear wheels exceed the preset threshold value, the controller reduces the traction torque to a preset torque value, and
   when the saturation index of the front wheels increases, the controller controls the vehicle to transmit the traction torque from the front wheel axle to the rear wheel axle, and when the saturation index of the rear wheels increases, the controller controls the vehicle to transmit the traction torque from the rear wheel axle to the front wheel axle.

2. The control device of claim 1, wherein
   the phase plane includes a stable region, an unstable region, and a boundary area that separates the stable region and the unstable region.

3. The control device of claim 2, wherein the boundary area is determined based on the slip angle of the front wheels at which understeer of the vehicle occurs and the slip angle of the rear wheels at which oversteer of the vehicle occurs.

4. The control device of claim 3, wherein the saturation index indicates a distance from the boundary area on the phase plane.

5. The control device of claim 1, wherein the controller compares the saturation index of the front wheels with the saturation index of the rear wheels and distributes the traction torque to the front wheel axle and the rear wheel axle.

6. A control method for a vehicle, comprising:
acquiring information on a driving direction and a speed of the vehicle;
calculating a slip angle of front wheels and a slip angle of rear wheels of the vehicle based on the information;
calculating a saturation index of the front wheels and a saturation index of the rear wheels using a phase plane related to the slip angle of the front wheels and the slip angle of the rear wheels;
calculating residual torque of a front wheel axle and a rear wheel axle; and
distributing traction torque to the front wheel axle and the rear wheel axle of the vehicle based on the phase plane, the saturation index, and the residual torque of the front wheels and the rear wheels,
wherein the distributing traction torque includes:
determining whether the saturation index of the front wheels and the saturation index of the rear wheels exceed a preset threshold value which is a value lower than the saturation index at which understeer or oversteer of the vehicle occurs,
reducing the traction torque to a preset torque value, when the saturation index of the front wheels and the saturation index of the rear wheels exceed the preset threshold value, and
controlling the vehicle to transmit the traction torque from the front wheel axle to the rear wheel axle when the saturation index of the front wheels increases, and controlling the vehicle to transmit the traction torque from the rear wheel axle to the front wheel axle when the saturation index of the rear wheels increases.

7. The control method of claim 6, wherein in the distributing of traction torque, the traction torque is distributed to the front wheel axle and the rear wheel axle by comparing the saturation index of the front wheels with the saturation index of the rear wheels.

* * * * *

UNITED STATES PATENT AND TRADEMARK OFFICE
CERTIFICATE OF CORRECTION

| | |
|---|---|
| PATENT NO. | : 12,240,441 B2 |
| APPLICATION NO. | : 17/888886 |
| DATED | : March 4, 2025 |
| INVENTOR(S) | : Lorenzo Pinto and Flavio Montalbano |

Page 1 of 1

It is certified that error appears in the above-identified patent and that said Letters Patent is hereby corrected as shown below:

On the Title Page

Please insert the following foreign application data:
--(30) Foreign Application Priority Data:
March 29, 2022 (DE) .................... 102022107413.7--.

Signed and Sealed this
Third Day of June, 2025

Coke Morgan Stewart
*Acting Director of the United States Patent and Trademark Office*